(12) United States Patent
Fredriksson et al.

(10) Patent No.: US 11,021,127 B2
(45) Date of Patent: Jun. 1, 2021

(54) VEHICLE AIRBAG THAT FORCES A HEAD RESTRAINT TO A FORWARD POSITION DURING INFLATION OF THE AIRBAG

(71) Applicant: Ford Global Technologies, LLC, Dearborn, MI (US)

(72) Inventors: Chris Fredriksson, LaSalle (CA); Alan George Dry, Grosse Pointe Woods, MI (US); Johnathan Andrew Line, Northville, MI (US); Benjamin Yilma, Canton, MI (US); Michael Steven Medoro, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 16/386,378

(22) Filed: Apr. 17, 2019

(65) Prior Publication Data

US 2020/0331418 A1 Oct. 22, 2020

(51) Int. Cl.
*B60R 21/207* (2006.01)
*B60R 21/217* (2011.01)
(Continued)

(52) U.S. Cl.
CPC ........ *B60R 21/207* (2013.01); *B60N 2/42727* (2013.01); *B60N 2/853* (2018.02);
(Continued)

(58) Field of Classification Search
CPC ... B60R 21/207; B60R 21/231; B60R 21/217; B60R 2021/2074; B60R 2021/23153; B60N 2/853; B60N 2/42727
See application file for complete search history.

(56) References Cited

U.S. PATENT DOCUMENTS 5,738,407 A * 4/1998 Locke .................. B60R 21/207
280/730.1
6,568,754 B1 * 5/2003 Norton ................. B60R 21/207
297/216.12
(Continued)

FOREIGN PATENT DOCUMENTS

DE 102007002185 A1 7/2008
JP 2000006751 A * 1/2000
JP 2001191886 A 7/2001

*Primary Examiner* — Darlene P Condra
(74) *Attorney, Agent, or Firm* — David Coppiellie; Price Heneveld LLP

(57) ABSTRACT

A seating assembly for a vehicle comprises: a seatback; an airbag having a stowed position and an inflated position, the airbag being configured to inflate from the stowed position to the inflated position in response to the vehicle impacting an object; a head restraint coupled to the seatback, the head restraint including a forward position, a rearward position, and a locking mechanism preventing the head restraint from moving from the forward position to the rearward position after taking the forward position; and as the airbag inflates from the stowed position to the inflated position, the airbag forces the head restraint from the rearward position to the forward position. As the airbag inflates from the stowed position to the inflated position and forces the head restraint to the forward position, the airbag does not contact the one or more support bars and does not force the seatback to change position.

20 Claims, 16 Drawing Sheets

(51) Int. Cl.
 *B60R 21/231* (2011.01)
 *B60N 2/427* (2006.01)
 *B60N 2/853* (2018.01)

(52) U.S. Cl.
 CPC .......... *B60R 21/217* (2013.01); *B60R 21/231* (2013.01); *B60R 2021/2074* (2013.01); *B60R 2021/23153* (2013.01)

(56) References Cited

U.S. PATENT DOCUMENTS

| | | |
|---|---|---|
| 7,484,753 B2 | 2/2009 | Sugimoto et al. |
| 2004/0066022 A1* | 4/2004 | Mori ................ B60R 21/214 280/730.1 |
| 2006/0186713 A1* | 8/2006 | Breed ................ B60N 2/829 297/216.12 |
| 2007/0158933 A1 | 7/2007 | Siemiantkowski |
| 2008/0073951 A1* | 3/2008 | Hattori ................ B60N 2/888 297/216.12 |
| 2011/0215555 A1* | 9/2011 | Nakaya ................ B60R 21/214 280/730.1 |
| 2013/0099908 A1* | 4/2013 | Salomonsson ...... B60R 21/0134 340/425.5 |

* cited by examiner

VEHICLE AIRBAG THAT FORCES A HEAD RESTRAINT TO A FORWARD POSITION DURING INFLATION OF THE AIRBAG

FIELD OF THE INVENTION

The present invention generally relates to a seating assembly of a vehicle, and more particularly, to an airbag disposed at the seating assembly that forces a head restraint of the seating assembly to a forward position during inflation of the airbag.

BACKGROUND OF THE INVENTION

During a vehicle impact event, where a vehicle impacts another object, a head of an occupant of a seating assembly of the vehicle and a head restraint of the seating assembly may move apart relative to each other.

SUMMARY OF THE INVENTION

As described herein, the present disclosure solves that problem by using an airbag.

Inflation of the airbag, in response to a sensed impact event, from a stowed position to an inflated position, forces the head restraint forward.

According to a first aspect of the present invention, a seating assembly for a vehicle comprises: a seatback; an airbag having a stowed position and an inflated position, the airbag being configured to inflate from the stowed position to the inflated position in response to the vehicle impacting an object; a head restraint coupled to the seatback, the head restraint including a forward position, a rearward position, and a locking mechanism preventing the head restraint from moving from the forward position to the rearward position after taking the forward position; and as the airbag inflates from the stowed position to the inflated position, the airbag forces the head restraint from the rearward position to the forward position.

Embodiments of the first aspect of the invention can include any one or a combination of the following features:
 one or more support bars that extend from the head restraint and into the seatback, coupling the head restraint to the seatback;
 as the airbag inflates from the stowed position to the inflated position and forces the head restraint from the rearward position to the forward position, the airbag does not contact the one or more support bars and does not force the seatback to change position;
 the seatback further includes a forward portion configured to contact and support an occupant of the seating assembly, and a rearward portion that faces generally the opposite direction as the forward portion;
 when the airbag is in the stowed position, the airbag is stowed within the seatback between the forward portion and the rearward portion;
 as the airbag transitions from the stowed position to the inflated position, the airbag extends through the rearward portion of the seatback, with a portion of the airbag remaining connected to the seatback between the forward portion and the rearward portion;
 the head restraint includes a forward portion configured to contact and support a head of an occupant of the seating assembly, and a rearward portion that faces in a generally opposite direction as the forward portion;
 as the airbag transitions from the stowed position to the inflated position, a top forward portion of the airbag contacts the rearward portion of the head restraint;
 as the airbag transitions from the stowed position to the inflated position, the top forward portion of the airbag exerts a force against the rearward portion of the head restraint that forces the head restraint toward and to the forward position;
 the seatback includes a top portion;
 the head restraint includes a forward portion configured to contact and support a head of an occupant of the seating assembly, and a rearward portion that faces in a generally opposite direction as the forward portion;
 in the inflated position, the airbag has a rearward portion that is rearward of, and covers, at least a portion of the rearward portion of the seatback, and a top forward portion that extends above the top portion of the seatback and against the rearward portion of the head restraint, with the head restraint in the forward position;
 in the inflated position, the airbag is disposed both rearward of the rearward portion of the seatback, above the top portion of the seatback, and adjacent to the rearward portion of the head restraint, with the head restraint in the forward position;
 a housing attached to the seatback that houses the airbag when the airbag is in the stowed position and from which the airbag extends when the airbag is in the inflated position;
 the housing includes a lateral surface that faces both the rearward portion of the head restraint and the rearward portion of the seatback;
 the housing includes a pair of opposing forwardly extending members that project forward from the lateral surface and sit upon the top portion of the seatback, with the head restraint disposed between the pair of forwardly extending members, such that one of the pair of forwardly extending members faces the first side portion of the head restraint when the head restraint is in the rearward position, and the other of the pair of forwardly extending members faces the second side portion of the head restraint;
 the head restraint includes a first side portion, and a second side portion that faces in a generally opposite direction as the first side portion;
 the housing further includes a top forward portion, and the airbag extends out of the housing proximate the top forward portion as the airbag inflates to the inflated position;
 the head restraint includes a top portion with a rearward extending lip that extends rearward beyond the rearward portion;
 as the airbag inflates from the stowed position to the inflated position, the airbag contacts and exerts a force against the lip of the head restraint that pushes the head restraint to the forward position; and
 in the inflated position, the airbag extends from the housing, then over the head restraint, and then downward forward of the seatback.

According to a second aspect of the present invention, a method of using an airbag in a vehicle in response to the vehicle impacting an object comprises: inflating an airbag of a vehicle from a stowed position to an inflated position; and using the inflation of the airbag to force a head restraint to move from a rearward position to a forward position.

Embodiments of the second aspect of the invention can include any one or a combination of the following features:

the head restraint is coupled to the seatback with one or more support bars that extend from the head restraint and into the seatback;

the step of using the inflation of the airbag to force a head restraint from a rearward position to a forward position includes the head restraint to move but not the one or more support bars or the seatback;

locking the head restraint in the forward position;

moving the head restraint from the rearward position to the forward position decreases the distance from the head restraint to the head of an occupant of a seating assembly to which the head restraint is attached;

the vehicle includes a seating assembly, and the head restraint and the airbag are both components of the seating assembly; and with the airbag, providing cushioning between the seating assembly and an occupant seated rearward of the seating assembly.

According to a third aspect of the present invention, a seating assembly for a vehicle comprises: a seatback; a head restraint having a forward position and a rearward position, and is coupled to the seatback with one or more support bars; an airbag that has a stowed position and an inflated position; and the airbag transitioning from the stowed position to the inflated position forces the head restraint to move from the rearward position to the forward position, but does not force the seatback or the one or more support bars to change position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
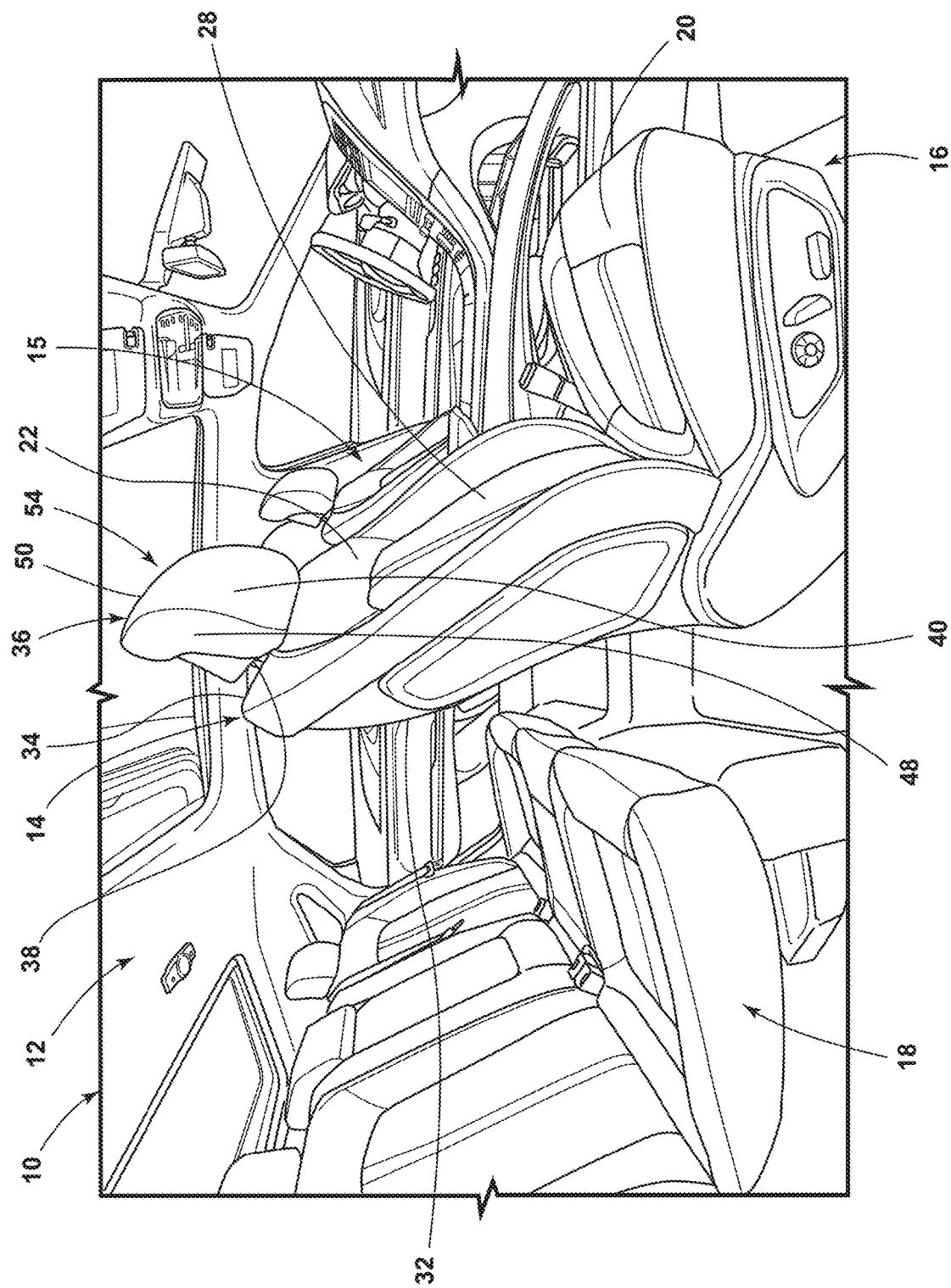
FIG. 1 is a perspective view of an interior of a vehicle, illustrating a seating assembly in a first row of seating that is forward of a second row of seating, the seating assembly includes a seatback, an airbag, and a head restraint in a rearward position.

For purposes of description herein, the terms "forward," "rearward," "upward," and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
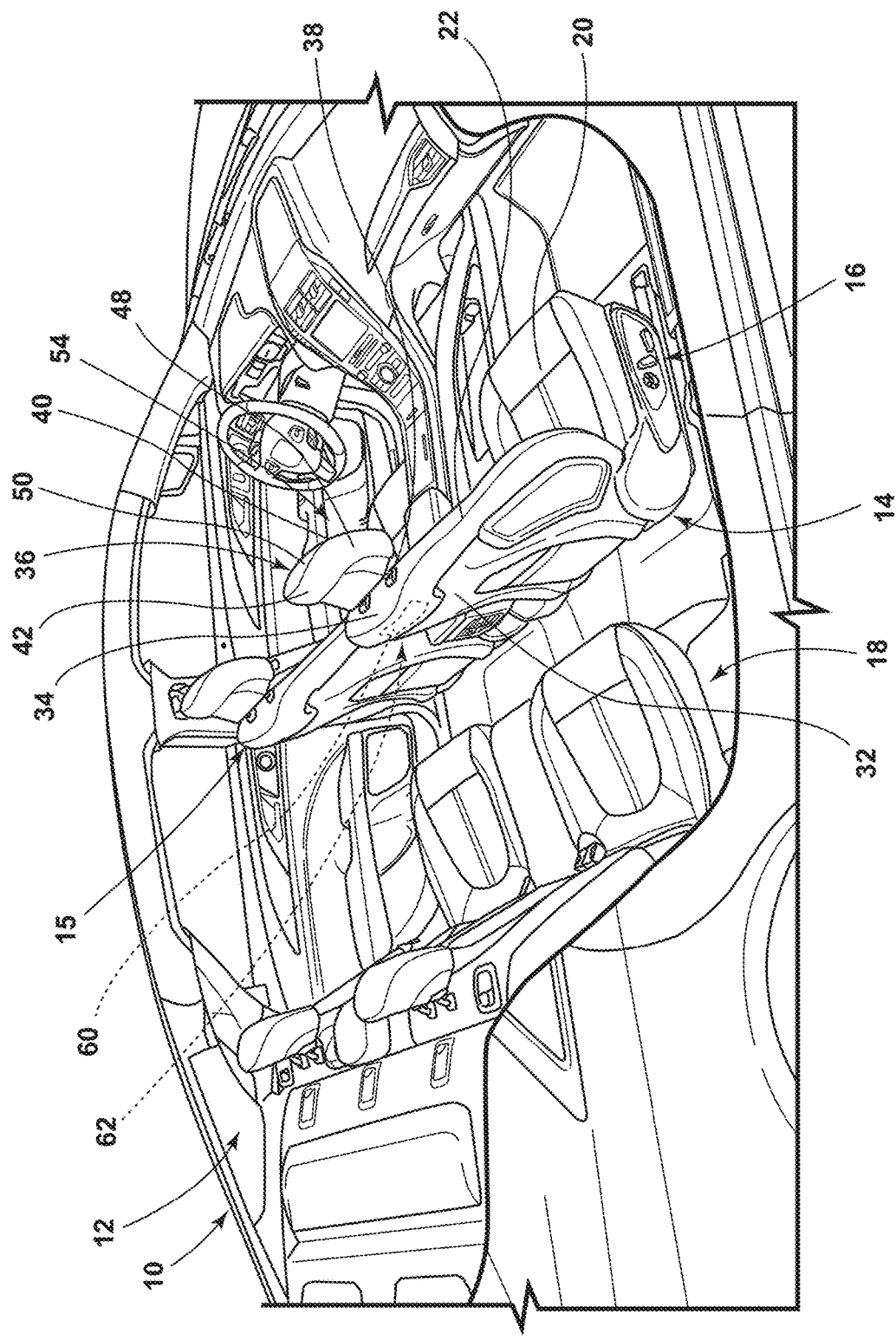
FIG. 2 is a perspective view of the interior of the vehicle of FIG. 1, from a slightly more rearward perspective, illustrating the airbag in a stowed position within the seatback of the seating assembly.
Figure 3:
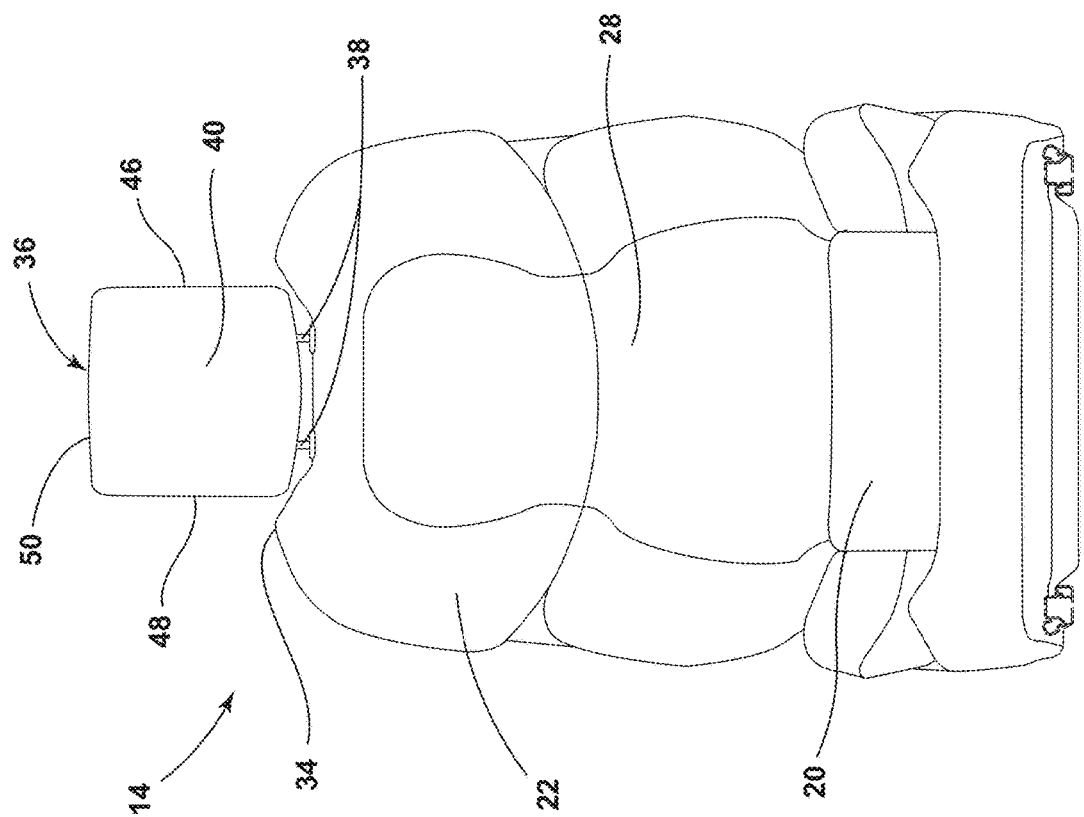
FIG. 3 is a front view of the seating assembly of FIG. 1, illustrating the head restraint having a first side, a second side, a forward portion, and a top portion.

Referring to FIGS. 1-3, a vehicle 10 includes an interior 12. The vehicle 10 further includes a seating assembly 14 and a seating assembly 15 forming a first row of seating 16. A second row of seating 18 is disposed rearward of the first row of seating 16. The vehicle 10 can include additional rows of seating. The vehicle 10 can be a car, a truck, a van, a sports utility vehicle, among other types. Because the seating assembly 14 can be identical to the seating assembly 15, for purposes of this disclosure, only the seating assembly 14 will be hereinafter particularly discussed.

The seating assembly 14 includes a seat 20 and a seatback 22, which can pivot forward and rearward relative to the seat 20. The seat 20 is configured to contact and support a lower portion 24 of an occupant 26 (see FIG. 11), while the seatback 22, particularly a forward portion 28 thereof, is configured to contact and support an upper portion 30 of the occupant 26. The seatback 22 further includes a rearward portion 32, which faces generally the opposite direction as the forward portion 28. The seatback 22 further includes a top portion 34, which faces generally upward.

The seating assembly 14 further includes a head restraint 36. The head restraint 36 is coupled to the seatback 22. In the illustrated embodiment, the head restraint 36 is coupled to the seatback 22 with a pair of support bars 38 that extend from the head restraint 36 and into the top portion 34 of the seatback 22. In other embodiments, one support bar 38 might be utilized, or some other form of attachment.

The head restraint 36 includes a forward portion 40 and a rearward portion 42. The forward portion 40 is configured to contact and support a head 44 of the occupant 26 of the seating assembly 14. The rearward portion 42 faces in generally the opposite direction as the forward portion 40. The head restraint 36 further includes a first side portion 46 and a second side portion 48, which faces in generally the opposite direction as the first side portion 46. For example, the first side portion 46 might face inboard, while the second side portion 48 faces outboard, or vice-versa. The head restraint 36 further includes a top portion 50 and a bottom portion 52. The top portion 50 generally faces upward and can provide a transition between the forward portion 40 and the rearward portion 42. The bottom portion 52 generally faces the top portion 34 of the seatback 22. In the illustrated embodiment, the support bars 38 extend from the head restraint 36 at the bottom portion 52 thereof.

Figure 4:
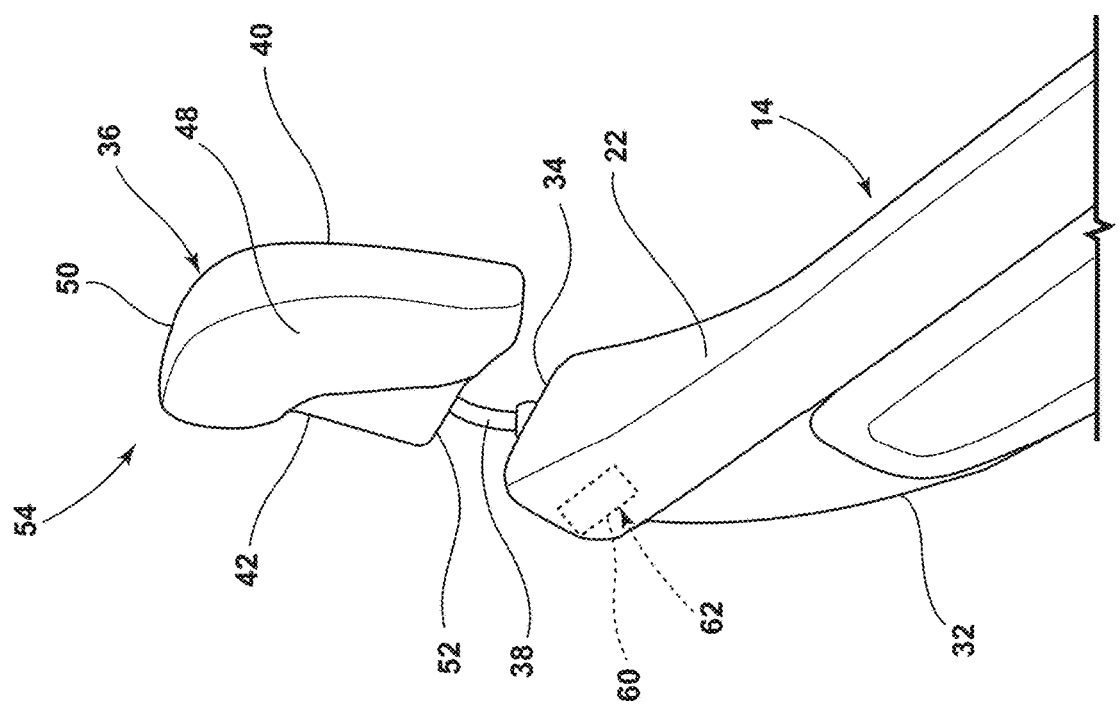
FIG. 4 is a side view of the seating assembly of FIG. 1, illustrating the head restraint further having a rearward portion, and a support bar connecting the head restraint to the seatback.
Figure 5:
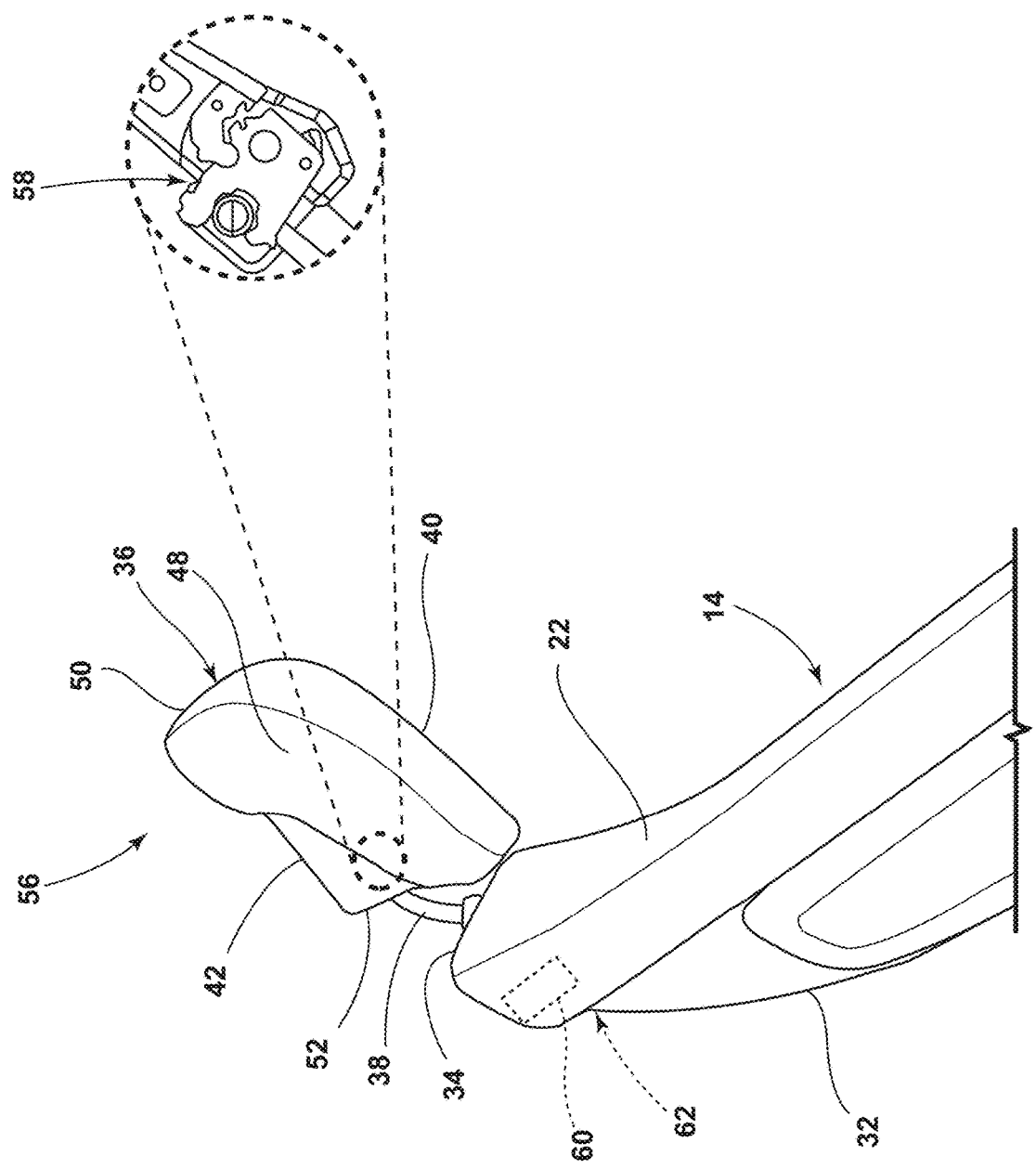
FIG. 5 is a side view of the seating assembly of FIG. 1, illustrating the head restraint with an internal locking mechanism locking the head restraint in a forward position.

Referring now additionally to FIGS. 4 and 5, the head restraint 36 has a rearward position 54 (FIG. 4) and a forward position 56 (FIG. 5). The head restraint 36 is positionable to, from, and between the rearward position 54 and the forward position 56. In the forward position 56, the top portion 50 of the head restraint 36 is disposed more forwardly than in the rearward position 54. To transition from the rearward position 54 to the forward position 56, the head restraint 36 can tilt forward, as in the illustrated embodiment, with the bottom portion 52 of the head restraint 36 staying in approximately the same position relative to the top portion 34 of the seatback 22 but the top portion 50 of the head restraint 36 is displaced forwardly. In other embodiments, the entire head restraint 36 is moved forward, with the top portion 50 and the bottom portion 52 of the head restraint 36 moving at least approximately equidistantly forward. The head restraint 36 further includes an internal locking mechanism 58 (see FIG. 5). In the illustrated embodiment, the locking mechanism 58 prevents the head restraint 36 from moving from the forward position 56 to the rearward position 54 after taking the forward position 56, unless the head restraint 36 is manipulated forwardly beyond the forward position 56, which causes the locking mechanism 58 to unlock until a spring-biasing mechanism (not illustrated) returns the head restraint 36 to the rearward position 54. Alternatively, the locking mechanism 58 can include a button (not illustrated) or some other release mechanism to allow a person to unlock the locking mechanism 58 to allow the head restraint 36 to move from the forward position 56 to the rearward position 54. There are a variety of locking mechanisms 58 known in the art.

Figure 6:
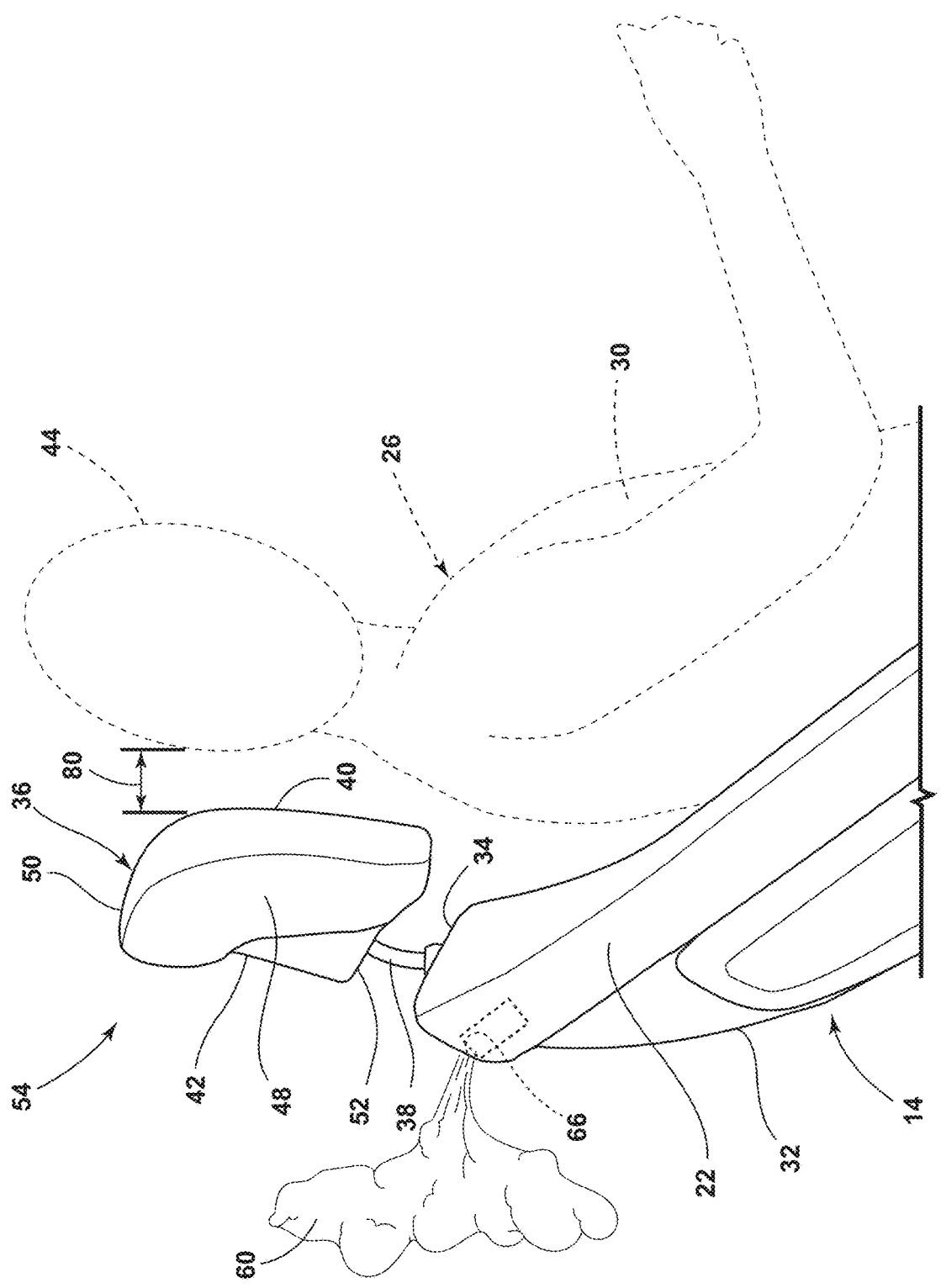
FIG. 6 is a side view of the seating assembly of FIG. 1, illustrating an occupant occupying the seating assembly while the vehicle is experiencing an impact event, the airbag is beginning to inflate while a connected portion remains connected to the seatback, and a distance separates a head of the occupant and the head restraint.
Figure 7:
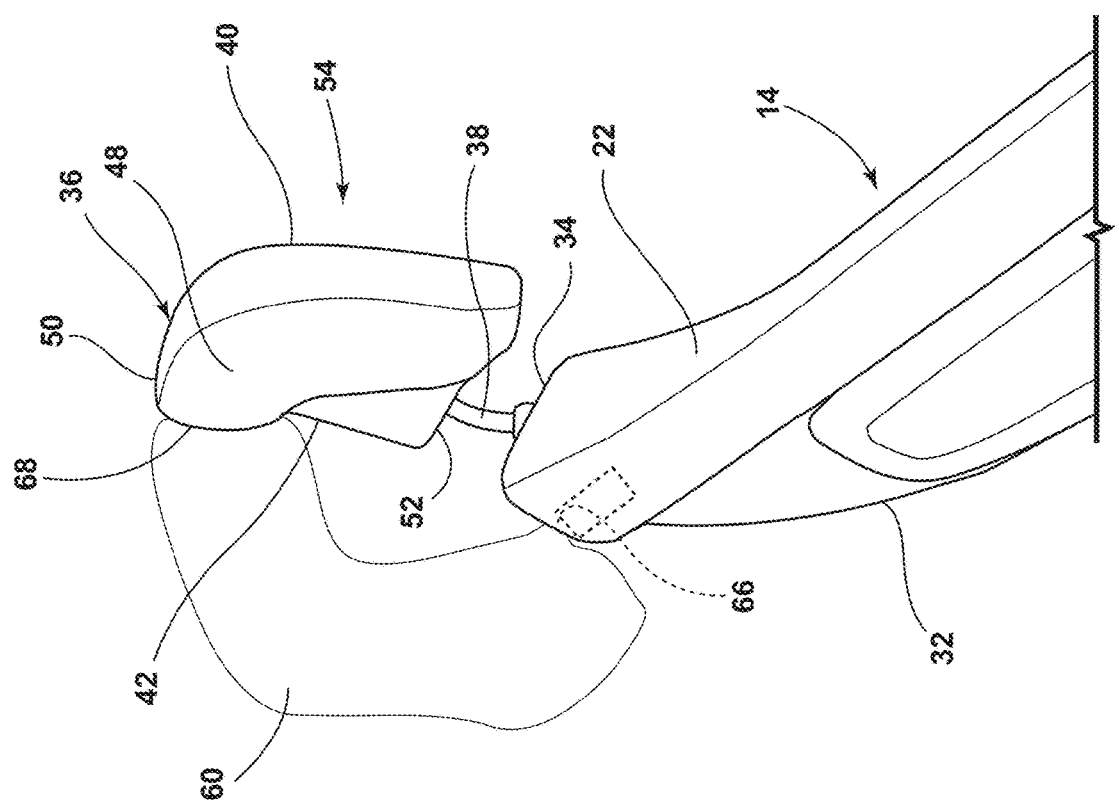
FIG. 7 is a side view of the seating assembly of FIG. 1, illustrating a point in time after that represented in FIG. 6, with the airbag inflating to the extent that a top forward portion of the airbag begins to contact the rearward portion of the head restraint.
Figure 8:
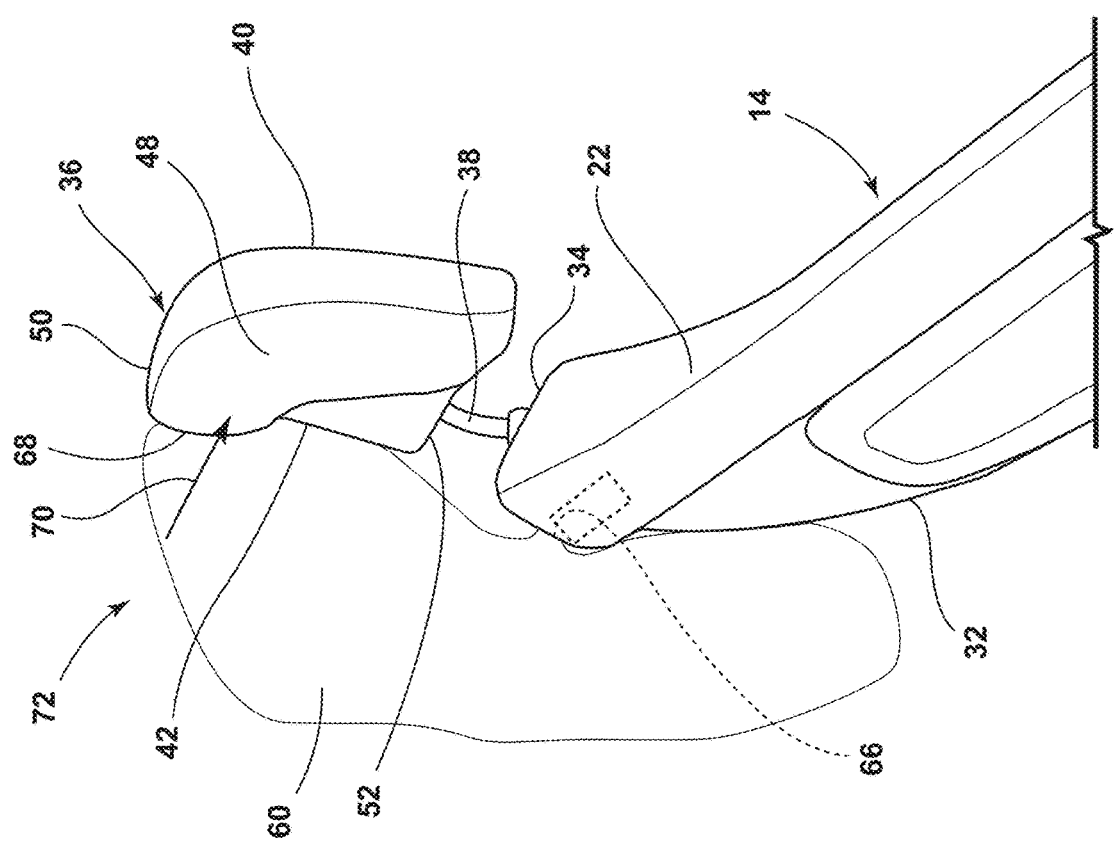
FIG. 8 is a side view of the seating assembly of FIG. 1, illustrating a point in time after that represented in FIG. 7, with the airbag inflating to the extent that the top forward portion of the airbag exerts a force on the head restraint that pushes the head restraint to a transitory position between the rearward position and the forward position.
Figure 9:
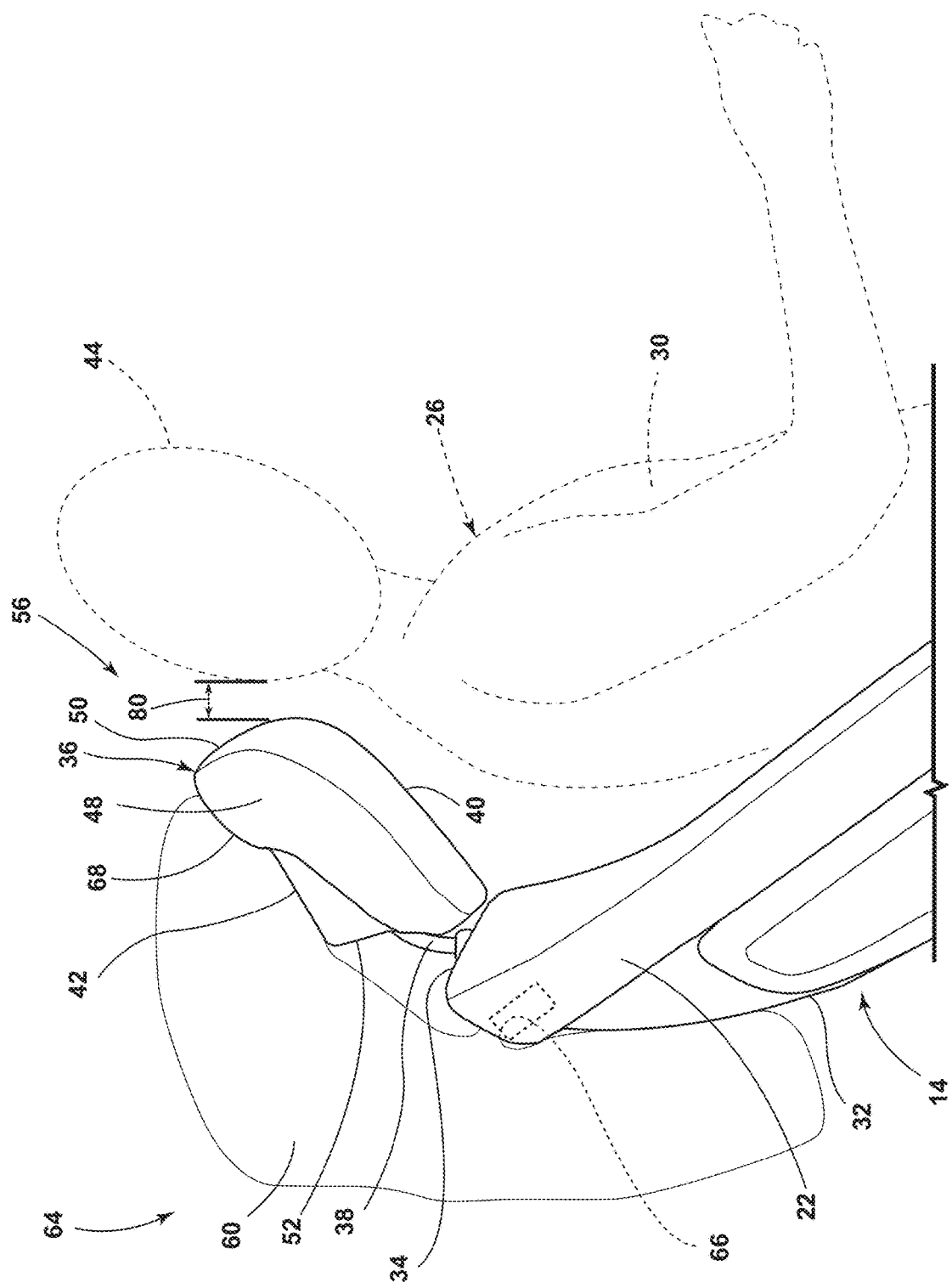
FIG. 9 is a side view of the seating assembly of FIG. 1, illustrating a point in time after that represented in FIG. 8, with the airbag inflated to the inflated position, and with the head restraint in the forward position, the distance between the head of the occupant and the head restraint has decreased.

Referring now additionally to FIGS. 6-9, the seating assembly 14 further includes an airbag 60, which is illustrated in sequence inflating from a stowed position 62 (see FIG. 5) to an inflated position 64 (see e.g., FIG. 9). In the stowed position 62, the airbag 60 is not inflated, and is housed within some component of the seating assembly 14. In the illustrated embodiment, in the stowed position 62, the airbag 60 is stowed within the seatback 22 of the seating assembly 14 between the forward portion 28 and the rearward portion 32 of the seatback 22. The airbag 60, like airbags known in the art, is configured to inflate from the stowed position 62 to the inflated position 64 in response to the vehicle 10 impacting an object (not illustrated), such as in response to an input signal from an inertial sensor (not illustrated). In FIG. 6, the airbag 60 is illustrated a brief moment after beginning to inflate. During inflation and while in the inflated position 64, a connected portion 66 of the airbag 60 remains connected to the seatback 22 between the forward portion 28 and the rearward portion 32. As the airbag 60 transitions from the stowed position 62 to the inflated position 64, as illustrated in FIG. 7, a top forward portion 68 of the airbag 60 contacts the rearward portion 42 of the head restraint 36. Next, as illustrated in FIG. 8, as the airbag 60 transitions from the stowed position 62 to the inflated position 64, the top forward portion 68 of the airbag 60 exerts a force 70 against the rearward portion 42 of the head restraint 36 toward the forward position 56, moving the head restraint 36 to a transitory position 72 between the rearward position 54 and the forward position 56. Finally, as illustrated in FIG. 9, the force 70 that the airbag 60 exerts on the head restraint 36 forces the head restraint 36 to the forward position 56. The dimensions of the airbag 60 while in the inflated position 64 can be such to force the head restraint 36 to the forward position 56 but not sufficiently forward beyond the forward position 56 to cause the locking mechanism 58 to unlock and return the head restraint 36 to the rearward position 54.

Although inflation of the airbag 60 has caused the head restraint 36 to move from the rearward position 54 to the forward position 56, inflation of the airbag 60 does not force the seatback 22 to change position, because the connected portion 66 of the airbag 60 connects to the seating assembly 14 at the seatback 22. In addition, inflation of the airbag 60 does not cause the airbag 60 to contact the support bars 38 connecting the head restraint 36 to the seatback 22 and, thus, does not cause the support bars 38 to change position. In other words, the airbag 60 causes the entirety of the head restraint 36 to move but not the support bars 38 or the seatback 22, the latter two of which remain static. Inflation of the airbag 60 from the stowed position 62 to the inflated position 64, in response to the impact event, forces the head restraint 36 to move from the rearward position 54 to the forward position 56. This intelligent cooperative design of the head restraint 36 and the airbag 60 eliminates the added costs of specialty components in the head restraint 36 to cause the head restraint 36 to move to the forward position 56 in response to a sensed impact event. The locking mechanism 58 prevents the head restraint 36 from returning to the rearward position 54 from the forward position 56.

In the inflated position 64, the airbag 60 is disposed rearward of the rearward portion 32 of the seatback 22. In other words, the airbag 60 is positioned between the rearward portion 32 of the seatback 22 and the second row of seating 18 that is rearward of the seating assembly 14. The airbag 60 covers at least a portion of the rearward portion 32 of the seatback. In addition, the airbag 60 extends above, but not necessarily abutting, the top portion 34 of the seatback 22. The airbag 60 further extends adjacent to and abutting the rearward portion 42 of the head restraint 36, which has been forced to the forward position 56.

Figure 10:
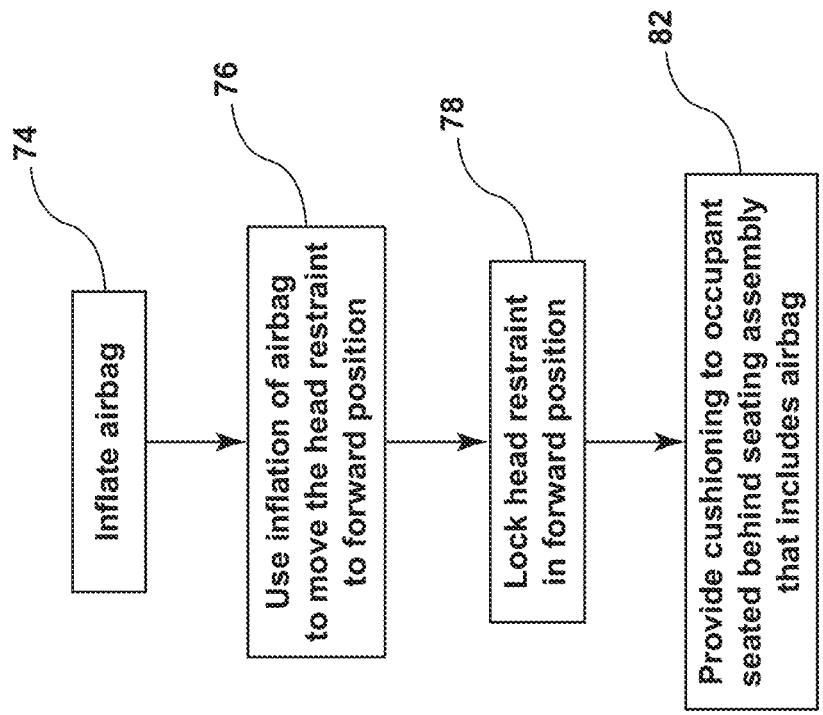
FIG. 10 is a diagram of a method of using the airbag of the seating assembly of FIG. 1, or some other seating assembly, such as to use the inflation of the airbag to force the head restraint to move from the rearward position to the forward position.

Referring now to FIG. 10, the above airbag 60 and the head restraint 36 are utilized in a novel method of using the airbag 60 in response to the vehicle 10 impacting another object. At step 74, the method includes inflating the airbag 60 of the vehicle 10 from the stowed position 62 to the inflated position 64. This inflation of the airbag 60 is described above. At step 76, the method further includes using the inflation of the airbag 60 to force the head restraint 36 to move from the rearward position 54 to the forward position 56. As described above, the inflation of the airbag 60 from the stowed position 62 to the inflated position 64 displaces the head restraint 36 that is in the rearward position 54, moving the head restraint 36 to the forward position 56. At step 78, the method further includes locking the head restraint 36 in the forward position 56. As described above, the head restraint 36 can include the locking mechanism 58 that prevents the head restraint 36 from returning to the rearward position 54.

Figure 11:
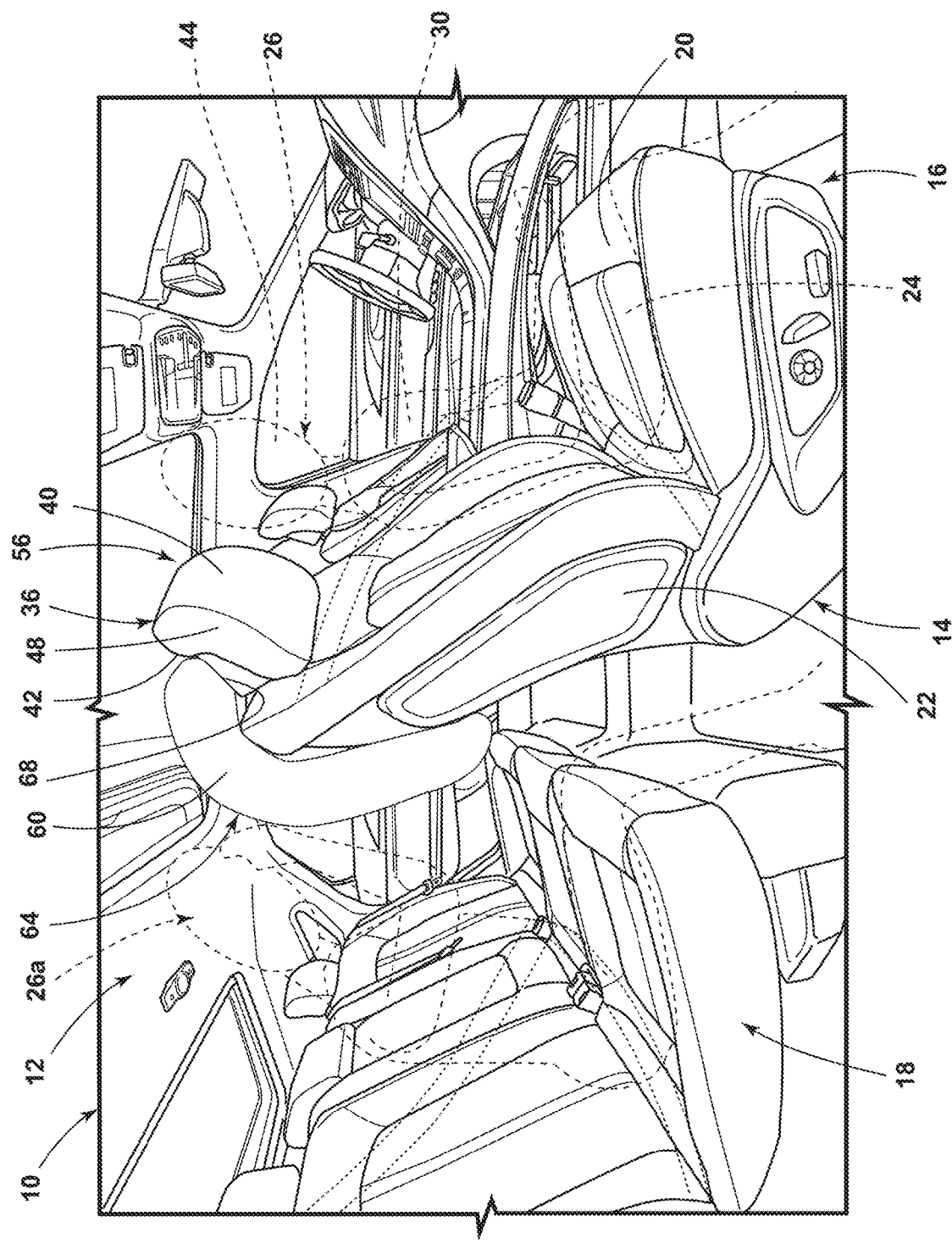
FIG. 11 is a perspective view of the interior of FIG. 1, illustrating the airbag in the inflated position offering protective cushioning to an occupant of the second row of seating and sitting behind the seating assembly after having forced the head restraint to the forward position to decrease the distance between the head of the occupant of the seating assembly and the head restraint and thus increase safety of the occupant of the seating assembly.

Referring now back to FIGS. 6 and 9, moving the head restraint 36 from the rearward position 54 (FIG. 6) to the forward position 56 (FIG. 9) decreases a distance 80 between the head restraint 36 and the head 44 of the occupant 26. Decreasing that distance 80 can be advantageous. In addition, as illustrated in FIG. 11, the method can further include at step 82 providing cushioning between the seating assembly 14 and an occupant 26 seated in the second row of seating 18 rearward of the seating assembly 14 of which the airbag 60 is a component. Thus, at least with the embodiment of the seating assembly 14 discussed above, the airbag 60 provides the multiple benefits of moving the head restraint 36 forward for the occupant 26 of the seating assembly 14 and additionally providing cushioning to the occupant 26a in the second row of seating 18 during the impact.

Referring now to FIGS. 12-16, an alternative embodiment seating assembly 14A is illustrated and herein described. The seating assembly 14A includes a housing 84 that houses an airbag 60A with the airbag 60A in the stowed position 62. The housing 84 includes a lateral surface 86, extending essentially in the inboard-outboard direction, and facing in a generally forward direction. The housing 84 further includes a top 88 and a bottom 90, which in the illustrated embodiment are orthogonal to the lateral surface 86. The lateral surface 86 extends from the top 88 to the bottom 90. The bottom 90 is disposed along the seatback 22, elevationally below the top portion 34 of the seatback 22. The top 88 can approximately elevationally coincide with the top portion 50 of a head restraint 36A. The lateral surface 86 thus faces both the rearward portion 32 of the seatback 22 and the rearward portion 42 of the head restraint 36A. The housing 84 further includes a pair of opposing forwardly extending members 91, 92 that project forward from the lateral surface 86. The pair of opposing forwardly extending members 91, 92 sit upon the top portion 34 of the seatback 22. The head restraint 36 is disposed between the pair of opposing forwardly extending members 91, 92. One of the forwardly extending members 91 faces the first side portion 46 of the head restraint 36A. The other of the forwardly extending members 92 faces the second side portion 48 of the head restraint 36A.

Figure 12:
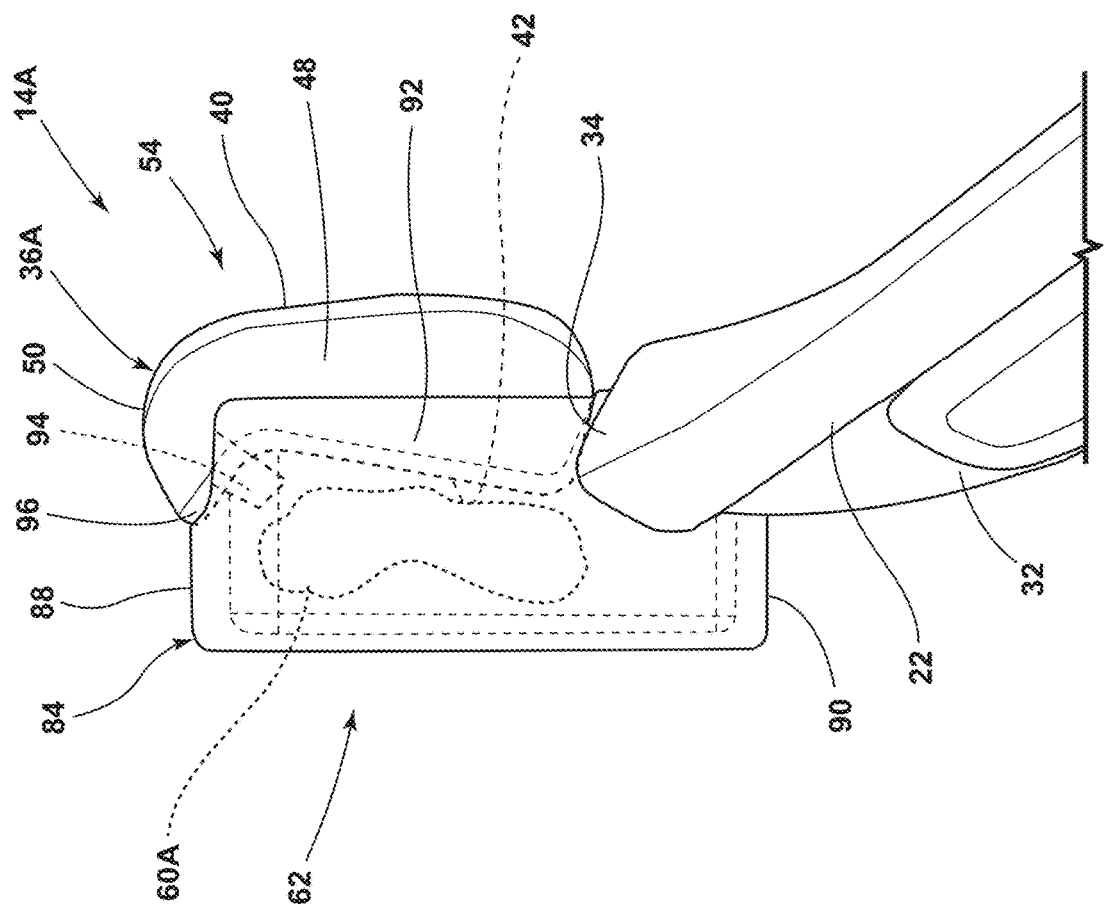
FIG. 12 is a side view of an alternative embodiment seating assembly of the vehicle of FIG. 1, illustrating an alternative embodiment airbag in the stowed position housed within a housing sitting upon the top portion of the seatback.
Figure 13:
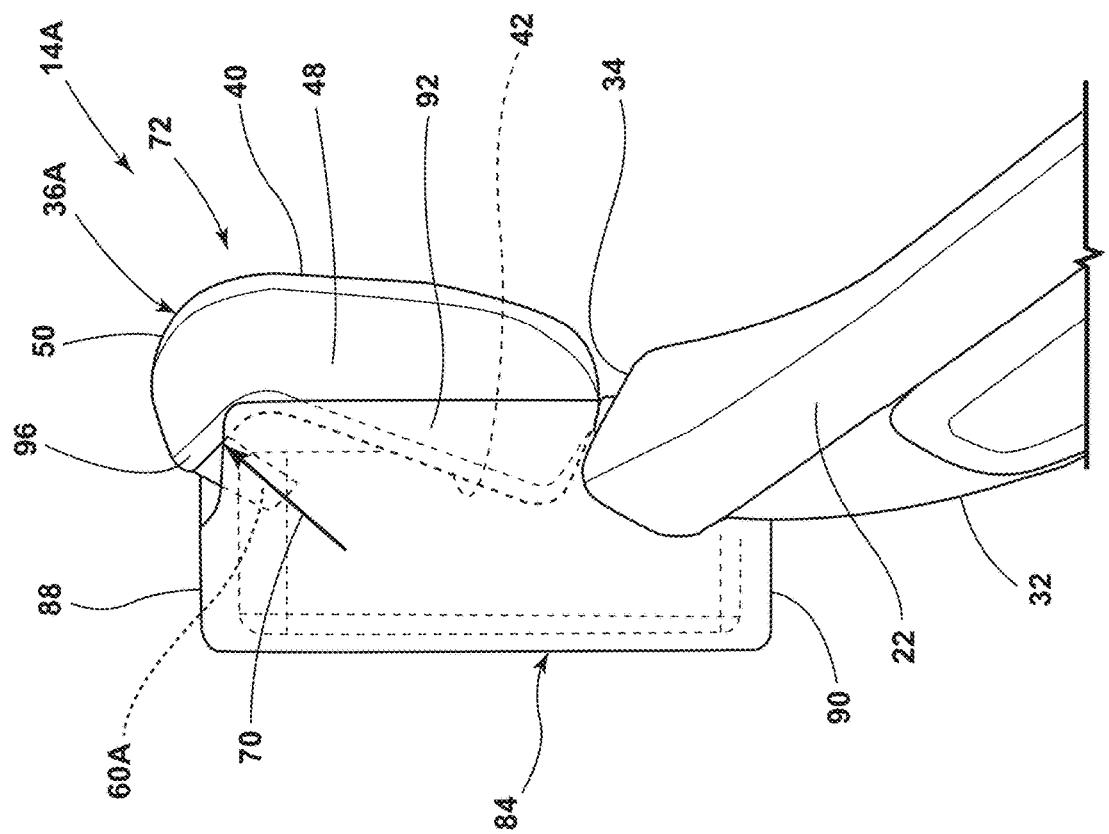
FIG. 13 is a side view of the seating assembly of FIG. 12, illustrating a point in time after FIG. 12 and during an impact event, with the airbag beginning to inflate and project out of a top forward portion of the housing and exerting a force upon a lip of the head restraint to push the head restraint to the transitory position.

The airbag 60A is illustrated in the stowed position 62 in FIG. 12, and the head restraint 36A is in the rearward position 54. Next, in FIG. 13, the airbag 60A is illustrated beginning to inflate to the inflated position 64. The housing 84 further includes a top forward portion 94. The airbag 60 extends out of the housing 84 proximate the top forward portion 94 as the airbag 60A begins to inflate. The partial inflation of the airbag 60A has pushed the head restraint 36A to the transitory position 72 between the rearward position 54 and the forward position 56. To assist the inflation of the airbag 60A in forcing the head restraint 36A to the forward position 56, the top portion 50 of the head restraint 36A of this embodiment of the seating assembly 14A includes a rearward extending lip 96 that extends rearward beyond the rearward portion 42 when the head restraint 36A is in the rearward position 54. As the airbag 60A inflates from the stowed position 62, the airbag 60A contacts and exerts the force 70 against the rearward extending lip 96 of the head restraint 36A that pushes the head restraint 36 toward and ultimately to the forward position 56.

Figure 14:
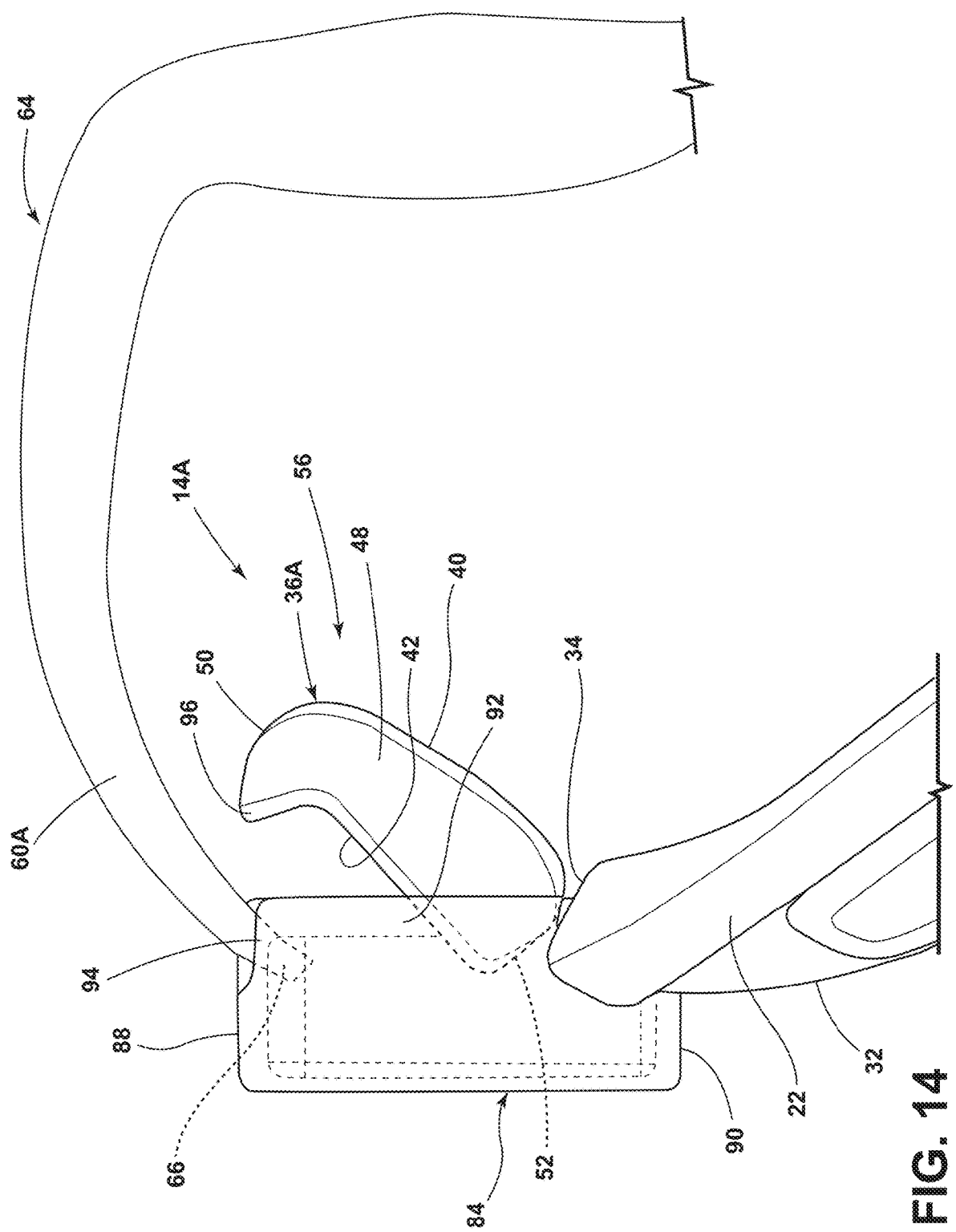
FIG. 14 is a side view of the seating assembly of FIG. 12, illustrating a point in time after FIG. 13, with the airbag in the inflated position and extending over the head restraint and seatback, and the head restraint is in the forward position.
Figure 15:
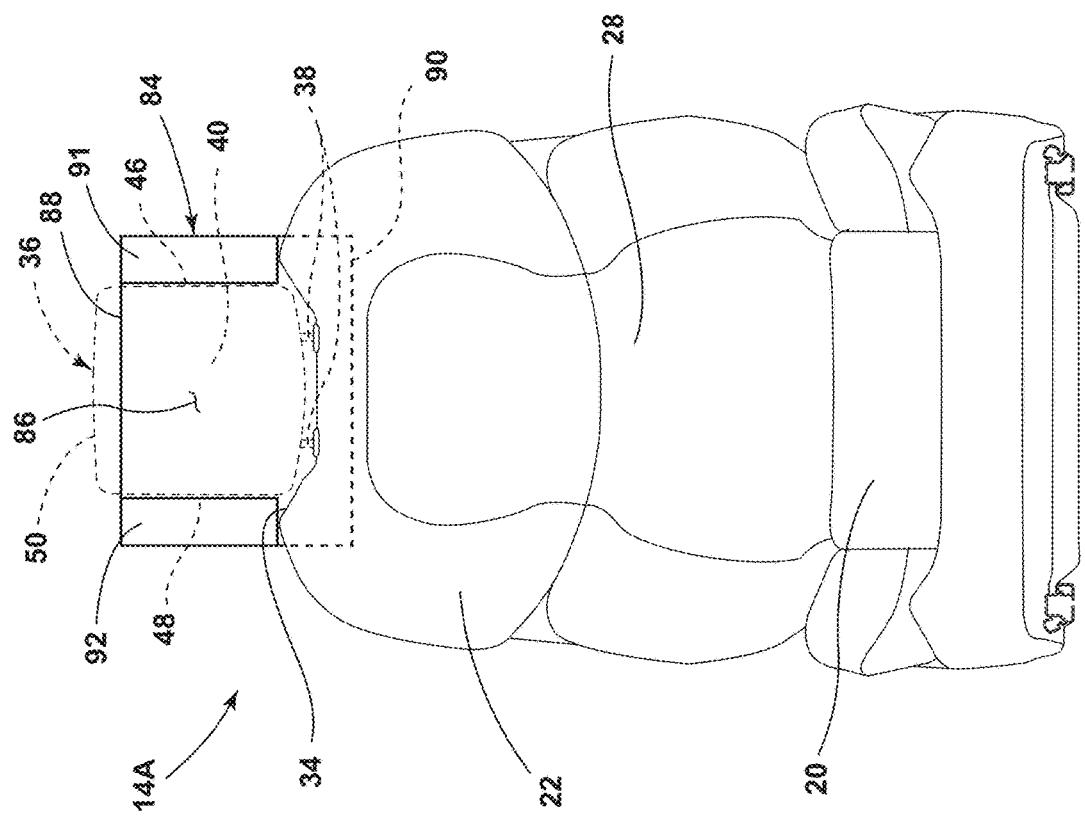
FIG. 15 is a front view of the seating assembly of FIG. 12, illustrating the head restraint nested between opposing forwardly extending members of the housing of the air bag.
Figure 16:
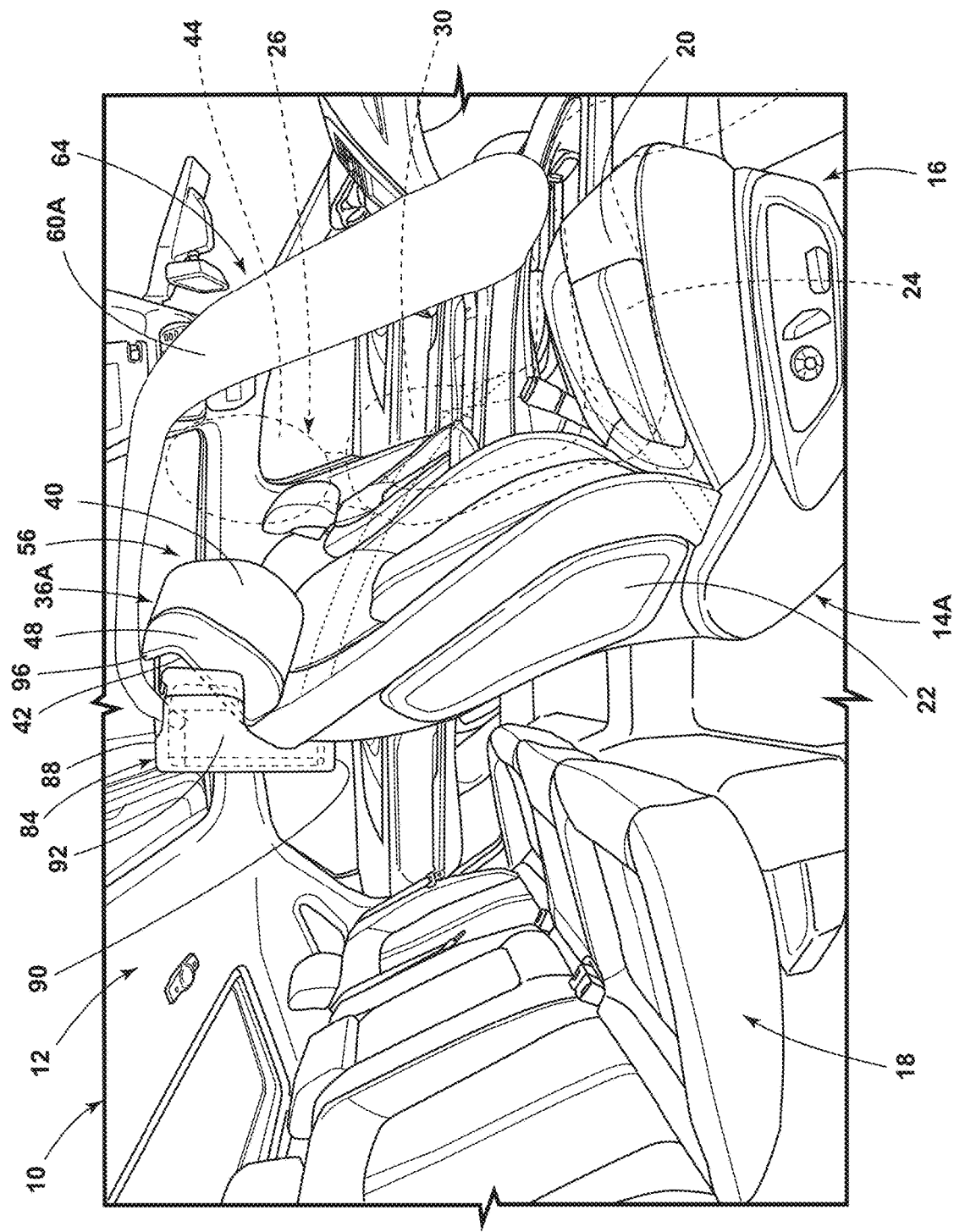
FIG. 16 is a perspective view of the vehicle of FIG. 1 with the seating assembly of FIG. 12, illustrating the airbag in the inflated position, after having forced the head restraint to the forward position, with the airbag extending first above and then downward in front of the occupant to protect the occupant of the seating assembly.

Next, in FIGS. 14 and 16, the airbag 60A is illustrated in the inflated position 64, having forced the head restraint 36A to the forward position 56. The airbag 60A extends from the housing 84, with a portion of the airbag 60A remaining connected to the housing 84. The airbag 60A extends from the housing 84, then forwardly over the head restraint 36A, and then downwardly forward of the seatback 22. The airbag 60A forms a cocoon of sorts over the occupant 26 of the seating assembly 14A during the impact, in addition to forcing the head restraint 36A to the forward position 56.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the afore-mentioned structure without departure from the concepts of the present disclosure, and further it is to be understood that such concepts are intended to be covered by the following claims unless these claims by their language expressly state otherwise.

What is claimed is:

1. A seating assembly for a vehicle comprising:
 a seatback comprising a forward portion configured to contact and support an occupant of the seating assembly, a rearward portion that faces generally the opposite direction as the forward portion, and a top portion;
 an airbag having a stowed position and an inflated position, the airbag being configured to inflate from the stowed position to the inflated position in response to the vehicle impacting an object; and
 a head restraint coupled to the seatback, the head restraint comprising a forward position, a rearward position, a locking mechanism preventing the head restraint from moving from the forward position to the rearward position after taking the forward position, a forward portion configured to contact and support a head of an occupant of the seating assembly, and a rearward portion that faces in a generally opposite direction as the forward portion;

wherein, when the airbag is in the stowed position, the airbag is stowed within the seatback between the forward portion and the rearward portion;

wherein, as the airbag inflates from the stowed position to the inflated position, the airbag contacts the rearward portion of the head restraint and the airbag forces the head restraint from the rearward position to the forward position; and wherein, in the inflated position, the airbag extends above the top portion of the seatback.

2. The seating assembly of claim 1 further comprising:

one or more support bars that extend from the head restraint and into the seatback, coupling the head restraint to the seatback;

wherein, as the airbag inflates from the stowed position to the inflated position and forces the head restraint from the rearward position to the forward position, the airbag does not contact the one or more support bars and does not force the seatback to change position.

3. The seating assembly of claim 1, wherein as the airbag transitions from the stowed position to the inflated position, the airbag extends through the rearward portion of the seatback, with a portion of the airbag remaining connected to the seatback between the forward portion and the rearward portion.

4. The seating assembly of claim 1, wherein as the airbag transitions from the stowed position to the inflated position, a top forward portion of the airbag contacts the rearward portion of the head restraint.

5. The seating assembly of claim 4, wherein as the airbag transitions from the stowed position to the inflated position, the top forward portion of the airbag exerts a force against the rearward portion of the head restraint that forces the head restraint toward and to the forward position.

6. The seating assembly of claim 1, wherein in the inflated position, the airbag has a rearward portion that is rearward of, and covers, at least a portion of the rearward portion of the seatback, and a top forward portion that extends above the top portion of the seatback and against the rearward portion of the head restraint, with the head restraint in the forward position.

7. The seating assembly of claim 1, wherein in the inflated position, the airbag is disposed rearward of the rearward portion of the seatback and above the top portion of the seatback, and adjacent to the rearward portion of the head restraint, with the head restraint in the forward position.

8. The seating assembly of claim 1, wherein the head restraint further comprises a top portion; and in the forward position, the top portion of the head restraint is disposed more forwardly than in the rearward position.

9. The seating assembly of claim 1, wherein in the stowed position, the airbag is not inflated; and the airbag inflates from the stowed position to the inflated position.

10. The seating assembly of claim 1, wherein when the occupant occupies the seating assembly; and as the airbag forces the head restraint from the rearward position to the forward position, a distance between the head restraint and the head of the occupant decreases.

11. A seating assembly for a vehicle comprising:

a seatback;

an airbag having a stowed position and an inflated position, the airbag being configured to inflate from the stowed position to the inflated position in response to the vehicle impacting an object; and a head restraint coupled to the seatback, the head restraint comprising a forward position, a rearward position, and a locking mechanism preventing the head restraint from moving from the forward position to the rearward position after taking the forward position; and a housing attached to the seatback that houses the airbag when the airbag is in the stowed position and from which the airbag extends when the airbag is in the inflated position;

wherein, as the airbag inflates from the stowed position to the inflate position, the airbag forces the head restraint from the rearward position to the forward position.

12. The seating assembly of claim 11, wherein the seatback comprises a top portion, a forward portion configured to contact and support an occupant of the seating assembly, and a rearward portion that faces in a generally opposite direction as the forward portion;

the head restraint further comprises a forward portion configured to contact and support a head of the occupant of the seating assembly, a rearward portion that faces in a generally opposite direction as the forward portion, a first side portion, and a second side portion that faces in a generally opposite direction as the first side portion; and the housing comprises:

a lateral surface that faces both the rearward portion of the head restraint and the rearward portion of the seatback; and a pair of opposing forwardly extending members that project forward from the lateral surface and sit upon the top portion of the seatback, with the head restraint disposed between the pair of forwardly extending members, such that one of the pair of forwardly extending members faces the first side portion of the head restraint when the head restraint is in the rearward position, and the other of the pair of forwardly extending members faces the second side portion of the head restraint when the head restraint is in the rearward position.

13. The seating assembly of claim 12, wherein the housing further comprises a top forward portion, and the airbag extends out of the housing proximate the top forward portion as the airbag inflates to the inflated position.

14. The seating assembly of claim 11, wherein the head restraint further comprises a forward portion configured to contact and support a head of an occupant of the seating assembly, a rearward portion that faces in a generally opposite direction as the forward portion, a first side portion, a second side portion that faces in a generally opposite direction as the first side portion, and a top portion with a rearward extending lip that extends rearward beyond the rearward portion; and as the airbag inflates from the stowed position to the inflated position, the airbag contacts and exerts a force against the rearward extending lip of the head restraint that pushes the head restraint to the forward position.

15. The seating assembly of claim 11, wherein in the inflated position, the airbag extends from the housing, then over the head restraint, and then downward forward of the seatback.

16. A method of using an airbag in a vehicle in response to the vehicle impacting an object comprising:

inflating an airbag of a vehicle from a stowed position to an inflated position;

using inflation of the airbag to force a head restraint of a seating assembly of the vehicle to move from a rearward position to a forward position; and with the airbag, providing cushioning between the seating assembly and an occupant seated rearward of the seating assembly.

17. The method of claim 16, wherein the head restraint is coupled to a seatback with one or more support bars that extend from the head restraint and into the seatback; and the step of using the inflation of the airbag to force a head restraint from a rearward position to a forward position includes causing the head restraint to move but not causing the one or more support bars or the seatback to move.

18. The method of claim 16 further comprising:

locking the head restraint in the forward position.

19. The method of claim 16, wherein moving the head restraint from the rearward position to the forward position decreases a distance from the head restraint to a head of an occupant of the seating assembly, to which the seating assembly the head restraint is attached.

20. The method of claim 16, wherein the head restraint and the airbag are both components of the seating assembly.

\* \* \* \* \*